US007414199B2

(12) United States Patent
Pasini

(10) Patent No.: US 7,414,199 B2
(45) Date of Patent: Aug. 19, 2008

(54) JOINED CABLE ASSEMBLY

(76) Inventor: Ciro Pasini, 7030 Woodbine Avenue, Suite 500, Markham, Ontario (CA) L3R 6G2

( * ) Notice: Subject to any disclaimer, the term of this patent is extended or adjusted under 35 U.S.C. 154(b) by 0 days.

(21) Appl. No.: 11/715,955

(22) Filed: Mar. 9, 2007

(65) Prior Publication Data

US 2007/0169340 A1 Jul. 26, 2007

Related U.S. Application Data

(62) Division of application No. 10/806,317, filed on Mar. 23, 2004, now Pat. No. 7,219,425.

(30) Foreign Application Priority Data

Apr. 4, 2003 (CA) .................................... 2424594

(51) Int. Cl.
*H02G 15/08* (2006.01)

(52) U.S. Cl. ......................... 174/90; 174/79; 174/94 R; 174/84 R; 29/868; 439/877

(58) Field of Classification Search ................... 29/825, 29/832, 840, 842, 871–878, 884; 174/76, 174/84 R, 88 R, 90, 94; 228/107, 131; 439/66, 439/877

See application file for complete search history.

(56) References Cited

U.S. PATENT DOCUMENTS

| | | | | |
|---|---|---|---|---|
| 2,367,206 | A | 1/1945 | Davis | |
| 3,668,778 | A | 6/1972 | Lindtveit et al. | |
| 3,670,090 | A | 6/1972 | Osteng | |
| 3,684,820 | A | 8/1972 | Johnsen | |
| 3,705,256 | A | 12/1972 | Eftestol et al. | |
| 3,780,927 | A | 12/1973 | Kudinov et al. | |
| 3,872,707 | A | 3/1975 | Broske | |
| 3,989,400 | A * | 11/1976 | Smith et al. | 403/275 |
| 7,219,425 | B2 * | 5/2007 | Pasini | 29/868 |
| 7,230,214 | B2 * | 6/2007 | Kirby | 219/535 |

* cited by examiner

*Primary Examiner*—Minh Trinh
(74) *Attorney, Agent, or Firm*—Manelli Denison & Selter PLLC; Edward J. Stemberger

(57) ABSTRACT

A joined cable assembly joins the interfacing ends of cables, one to another. The joint includes a pair of cables, each cable having an end and comprising a first plurality of conductor strands. A terminal enlarging member is provided longitudinally of each cable producing an enlarged terminal portion of greater diameter than said cable adjacent said end. A connecting tube is compressed at least around the conductor strands at the enlarged terminal portions of each cable, thereby joining the cables.

12 Claims, 3 Drawing Sheets

JOINED CABLE ASSEMBLY

This application is a division of U.S. application Ser. No. 10/806,317 filed on Mar. 23, 2004 now U.S. Pat. No. 7,219,425.

FIELD OF THE INVENTION

The present invention relates to a method for joining wires, rods, cables, high tension lines and the like and for attaching an end fastener thereto, by means of an explosive charge; to said fastener for use in said method, and to a joined wire fastener combination when made by said process.

BACKGROUND OF THE INVENTION

In connection with heavy gauge wires, which may be disposed in positions which are difficult to reach, commensurately high powered tools are required to make pressure connections between said wires. In view of the weight and bulk of the tools it may be inconvenient or impossible to carry such tools to the sites at which the joining is to be made.

It has previously been proposed to connect ends of wires and the like by inserting the ends into a corresponding bore of a connecting member provided with an external layer of explosive, which during detonation, compresses the connecting member around the ends. The layer of explosive used had, however, an even cross-section along the whole length thereof in order to produce an even radial compression of the connecting member.

In connection with high tension lines, supporting cables and the like, which are subjected to heavy stresses, it is of great importance to obtain a permanent, tight clamping effect of the connecting member to ensure that no relative sliding movement may occur between the member and the ends connected thereby.

Thus, such connectors, herein termed implosive connectors, have been used in high energy metalworking to replace conventional hydraulic compression fittings for high voltage transmission lines. A small charge, engineered for each connector, supplies the energy to complete the installation in 1/10,000 of a second, replacing the work of a 60 to 100 ton press. Such implosive connectors are completely metallic fitting and result in a void free, uniformly smooth and straight connector.

In more detail, generally, implosive connectors comprise a conductor splice consisting of an outer aluminum sleeve equipped with a pre-mounted implosive charge, and filler, preferably, optionally, an inner steel sleeve having an aluminum tube on the outside.

However, there remains a need for a method of joining ends of wires and the like which is cheaper, quicker and easier to install while providing at least an acceptable efficacious permanent join of the wires.

SUMMARY OF THE INVENTION

It is an object of the present invention to provide a method of joining ends of wires and the like which is cheaper, faster and easier to effect than prior art methods and apparatus.

It is a further object to provide a connector for joining ends of wires and the like of use in the aforesaid method.

It is a further object of the invention to provide a joined cable assembly comprising a connecting tube and a joined cable when produced by a method as hereinabove defined.

Accordingly, the invention provides in one aspect, a method of joining the interfacing ends of a plurality of wire cables, each cable comprising a first plurality of conductor strands, said method comprising (a) providing each of said ends with an enlarged terminal portion of greater diameter than said cable adjacent said end, (b) inserting said ends into a connecting tube;

(c) providing said tube with an outer layer of an explosive charge, and (d) detonating the explosive layer so as to compress the connecting tube around the conductor strands.

Preferably, the method as hereinabove defined comprises providing each of the ends with a terminal enlarging member longitudinally of the cable through the terminal portion to effect the enlargement.

The enlarging member is most preferably formed of a metal or alloy thereof, e.g. a steel rod insert or an inner sleeve, and, most preferably, having a head such as to constitute a stud, cap or the like.

The terminal portions so abut each other within the connector as to provide a resultant effective joint after the detonation. It can be appreciated that use of a pair of aforesaid flat-headed inserts or caps can enhance the stability and conductivity of such a resultant joint.

Accordingly, the invention provides in preferred embodiments a method as hereinabove defined wherein the terminal enlarging member is a metal inner sleeve, which inner sleeve embraces at least one of the conductor strands at an inner location within the plurality of the conductor strands.

Preferably, the metal sleeve embraces a second plurality of the conductor strands at an inner location within the first plurality of said conductor strands, wherein the second plurality is a portion of the first plurality of conductor strands.

As hereinabove defined, preferably, the metal inner sleeve has a flat head which abuts another flat head, one to another in interface relationship within the connecting tube prior and subsequent to the detonation.

The second plurality of conductor strands at an inner location within said first plurality of conductor strands are, preferably, formed of steel, while the remainder of the first plurality are formed of aluminum or alloy thereof.

Thus, the inner sleeve or cap can embrace a single, but, preferably, a major portion of, and more preferably, all of the second plurality of the conductor strands. Clearly, the sleeve or cap could also further embrace some of the remaining conductor strands which surround the second plurality of strands, if desired. Thus, some or all of the outer strands are splayed upon insertion of the sleeve or cap.

The terminal enlarging member, constituted as a rod or sleeve preferably has a flat head to prevent the member being pushed too far into the bundle of conductor strands to result in poor abutment of the interfacing bundle of strands.

The choice between using a flat headed pin, nail or the like, in preference to a cap, or vice versa, generally depends on the size of the diameter and strength of the conductor bundle. If a relatively small diameter cable, say, for example, of less than 2.5 cm diameter the flat headed pin is preferred. For a larger diameter and stronger cable bundle, the embracing sleeve or cap is used to account for the larger surface area between the sleeve's cylindrical outer surface and the surface of the inner core strands, which are generally formed of steel, and to account for the strength of the whole conductor to force out and splay the outer strands and prevent the inner wire strands from slipping away.

It can be readily seen that by increasing the terminal extremity diameter of the cable relative to the cable adjacent the terminal portions, according to the invention, by means of the inserts, results in the cables having a larger diameter than the rest of the conductor inside the sleeve of the connector. Thus, the conductor is so anchored within the sleeve that it cannot disadvantageously slip or be displaced.

In a most preferred method, the invention provides use of a connector wherein the explosive layer comprises a first portion of explosive and a second portion of explosive, separated therefrom by an intervening interportion distance, wherein each of the first and second portions is of greater thickness than at interportion distance, and wherein the first and second portions are disposed on the outside surface of the connecting tube such that the interportion surrounds each of the enlarged terminal portions of the ends of the cables; and the first and second portions surround the respective cables adjacent the ends, prior to detonation, as to effect a greater explosive compaction force onto the cables adjacent the ends relative to the forces exerted on the terminal portions.

Thus, in a further feature, the invention provides a connector as hereinabove defined of use in the methods as hereinabove defined.

In a still further aspect, the invention provides a joined cable assembly comprising a connecting tube and cable resulting from a method as hereinabove defined.

BRIEF DESCRIPTION OF THE DRAWINGS

In order that the invention may be better understood, preferred embodiments will now be described by way of example only with reference to the accompanying drawings wherein.

DETAILED DESCRIPTION OF PREFERRED EMBODIMENTS

Figure 1A:
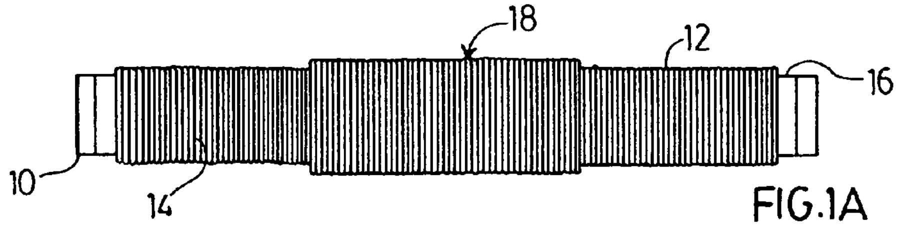
FIGS. 1A-1H represent diagrammatic sketches of the components and preparatory steps practised in a general method of explosively joining wire ends with a connector, according to the prior art.
Figure 1B:
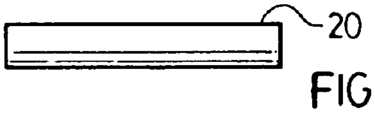
Figure 1C:
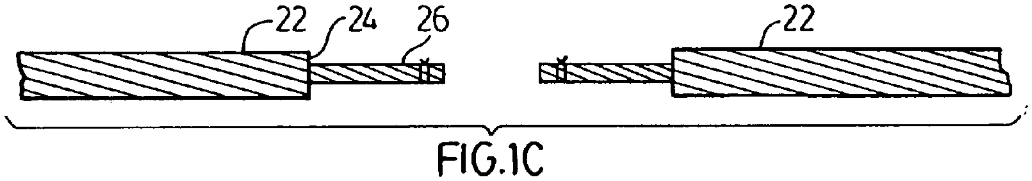
Figure 1D:
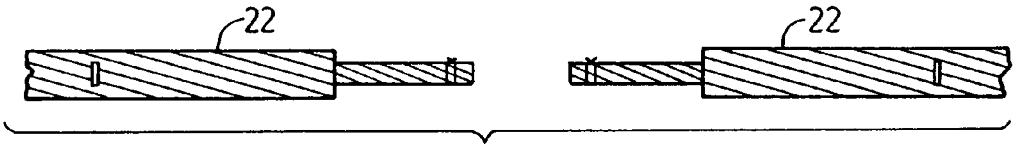
Figure 1E:
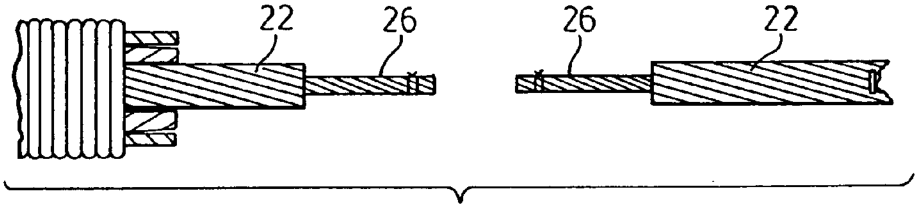
Figure 1F:
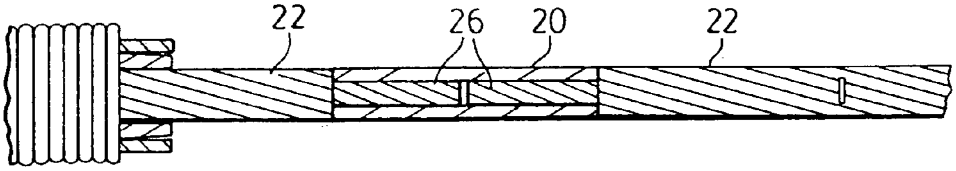
Figure 1G:
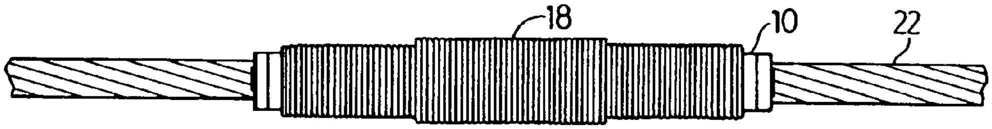

With reference to FIGS. 1A and 1B, a conductor splice consists of (a) an outer aluminum cylindrical sleeve (10) having a pre-mounted implosive charge layer (12) coiled around the outer surface (16) of connector (10). Layer (12) is of uniform thickness essentially the length of surface (16) except at a thicker central portion (18) (FIG. 1A); and (b) an inner steel sleeve (20) having an aluminum filter tube (not shown) on the outside (FIG. 1B).

Operational guidance as given to operators in the field follows with reference to FIGS. 1C-1H.

Figure 1H:
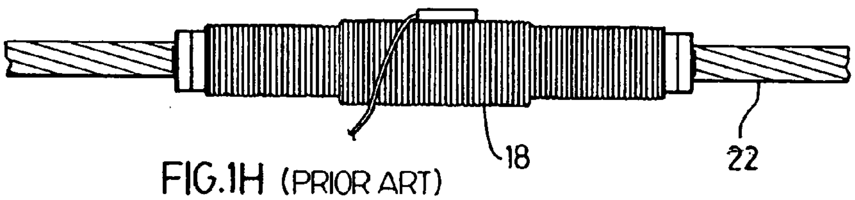
FIG.1H (PRIOR ART)

1. Cut conductors (22) as cleanly as possible and minimize burring or bending aluminum strands (24). Cut steel strands (26) at a distance of half the length of inner steel sleeve (20) less 0.1 in. (2-3 mm). Rewind any loose steel strands and bind securely with wire. (FIG. 1C).
2. Mark each end of conductors (22) at a distance of half the length of outer aluminum sleeve (10) less 0.1 (2-3 mm). (FIG. 1D).
3. Slide the combined charge and aluminum sleeve (10) onto one of conductor (22) ends. (FIG. 1E).
4. Insert steel sleeve (20) into the core of conductor (22) and remove the binding wire. Repeat with the other conductor (22) end and push both conductors (22) until steel strands (26) meet inner steel sleeve (20). (FIG. 1F).
5. Slide the combined charge and aluminum sleeve (10) until each end of the sleeve corresponds with the marks previously made. (FIG. 1G).
6. Mount the assembly and tape the detonator securely at the indicated position on the implosive sleeve (FIG. 1H). Before initiation, ensure that outside aluminum sleeve (10) is correctly positioned with conductors (22). (FIG. 1H).
7. Effect initiation and detonation.

Figure 2A:
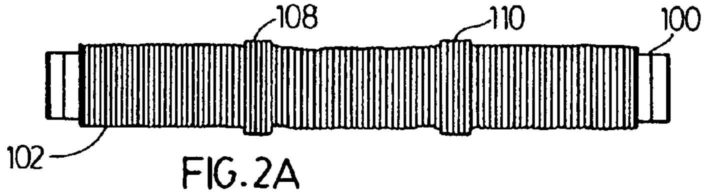
FIGS. 2A-2E represent diagrammatic sketches of the components and preparatory steps practised in a general method of explosively joining wire ends with a connector, according to the present invention.
Figure 2B:
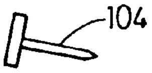
Figure 2C:
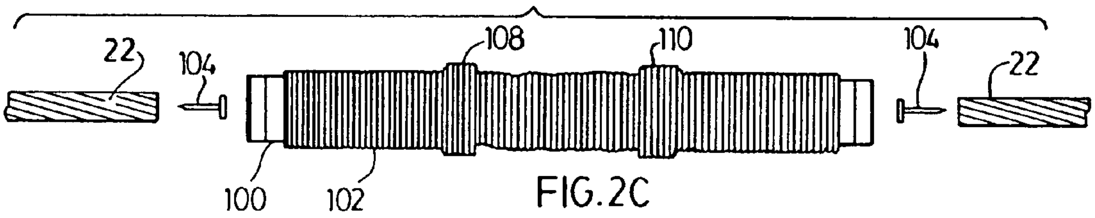
Figure 2D:
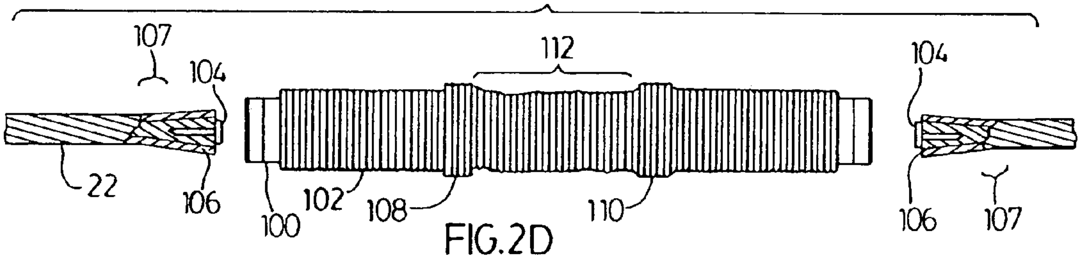

With reference to FIGS. 2A-2E, the conductor splice of use in the present invention consists of an outer aluminum sleeve (100) shown in FIG. 2A equipped with a pre-mounted implosive charge (102), wherein the amount of implosive charge is approx. 20-25% less than the aforesaid prior art embodiment of FIG. 1A and a pair of studs (104) steel insert (FIG. 2B).

In instructional format, the operational steps are as follows.

Figure 3:
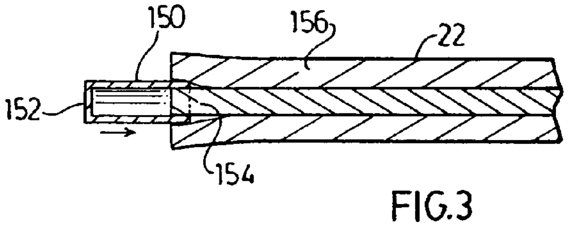
FIG. 3 is a diagrammatic sketch of a cap within a plurality of strands of a cable, according to the invention.

Cut conductors (22) as cleanly as possible. Push steel stud (104) through the center of conductor (22) at the end thereof until the aluminum head of stud (104) rests against the conductor (FIGS. 2C and 2D) and provides an enlarged terminal portion (106). The steel stud (104) is an example of a terminal enlarging member. The terminal enlarging member is most preferably formed of a metal or alloy thereof, e.g. a steel rod insert or an inner sleeve, and, most preferably, having a head such as to constitute a stud (104), cap (150) (as shown in FIG. 3), or the like.

Figure 2E:
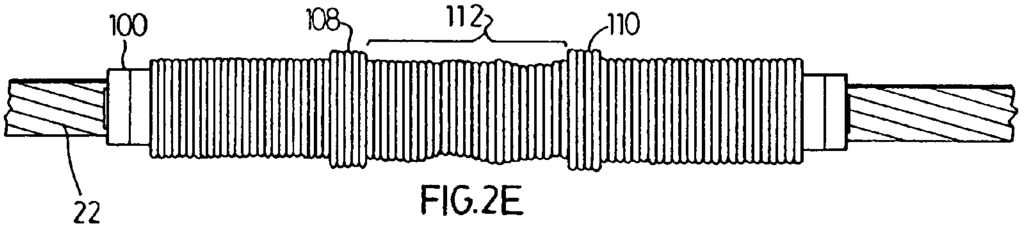

Insert both conductors (22) inside the implosive aluminum sleeve (100), one on each side, until they abut at the center of sleeve (100) (FIG. 2E).

Main sleeve (100) has a layer of explosive cord (102) of essentially uniform thickness along the length of sleeve (100), except at a first portion (108) and a second portion (110) displaced from the middle of sleeve (100) as to provide an intervening interportion distance (112) which interportion layer of explosive surrounds each of the enlarged terminal portions (106). Each of first and second explosive layers at portions (108) and (110) has a greater thickness than at said interportion distance, and wherein said first and second portions are disposed on the outside surface of said connecting tube such that said interportion surrounds each of said enlarged terminal portions of said ends of said cables and said first and second portion surround said cables adjacent said ends, prior to said detonation, as to effect a greater explosive compaction force onto said cables adjacent said ends relative to the forces exerted on said terminal portions.

The explosive is initiated as an implosive charge as for prior art embodiments.

FIG. 3 shows a cap or sleeve 150 as an example of a terminal enlarging member having a head 152 partly inserted into cable 22 to surround an inner of steel strands 154 and surrounded by outer aluminum strands 156. The arrow indicates the direction that cap 150 is to be moved to be fully inserted into cable 22.

Figure 4:
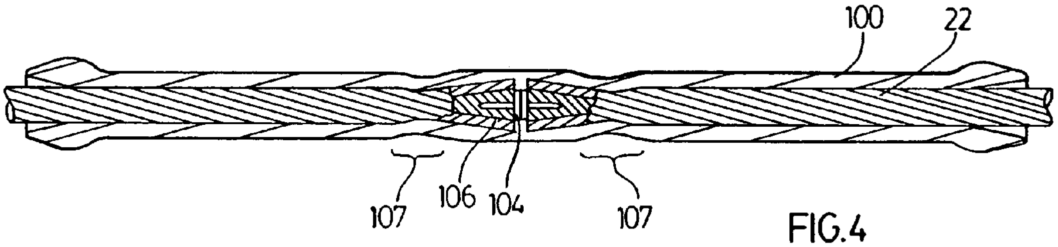
FIG. 4 is a diagrammatic longitudinal cross-section of a resultant joint according to a method and components according to the invention; and wherein the same numerals denote like parts.

FIG. 4 is a diagrammatic longitudinal cross-section of a resultant join according to a method and components according to the invention.

It can, thus, be readily seen that most advantageously only a single connector, sleeve or the like need be used to provide a most efficacious joint, in a faster and cheaper manner than the prior art methods, while providing a non-slip product.

Although this disclosure has described and illustrated certain preferred embodiments of the invention, it is to be understood that the invention is not restricted to those particular embodiments. Rather, the invention includes all embodiments which are functional or mechanical equivalents of the specific embodiments and features that have been described and illustrated.

The invention claimed is:

1. A joined cable assembly joining the interfacing ends of cables, one to another, the joint comprising:

a pair of cables, each cable having an end and comprising a first plurality of conductor strands, a terminal enlarging member provided longitudinally of each cable producing an enlarged terminal portion of greater diameter than said cable adjacent said end, and a connecting tube compressed at least around the conductor strands at the enlarged terminal portions of each cable, thereby joining the cables, wherein said enlarging member is a metal stud.

2. The assembly as defined in claim 1, wherein said metal stud has a flat head.

3. The assembly as defined in claim 2, wherein said flat heads abut one to another within said connecting tube.

4. The assembly as defined in claim 1, wherein the connecting tube is of aluminum material constructed and arranged so that the compression thereof can be caused by an explosive force without destruction of the tube.

5. A joined cable assembly joining the interfacing ends of cables, one to another, the joint comprising:

a pair of cables, each cable having an end and comprising a first plurality of conductor strands, a terminal enlarging member provided longitudinally of each cable producing an enlarged terminal portion of greater diameter than said cable adjacent said end, and a connecting tube compressed at least around the conductor strands at the enlarged terminal portions of each cable, thereby joining the cables. Wherein said terminal enlarging member is a metal inner sleeve, which inner sleeve embraces at least one of said conductor strands at an inner location within said plurality of said conductor strands.

6. The assembly as defined in claim 5, wherein said metal sleeve embraces a second plurality of said conductor strands at an inner location within said first plurality of said conductor strands, wherein said second plurality is a portion of said first plurality of conductor strands.

7. The assembly as defined in claim 6, wherein said metal sleeve has a flat head.

8. The assembly as defined in claim 7, wherein said flat heads generally abut one to another within said connecting tube.

9. The assembly as defined in claim 6, wherein said second plurality of conductor strands at an inner location within said first plurality of conductor strands are formed of steel, while the remainder of said first plurality are formed of aluminum or alloy thereof.

10. The assembly as defined in claim 5, wherein said metal sleeve has a flat head.

11. The assembly as defined in claim 10, wherein said flat heads generally abut one to another within said connecting tube.

12. The assembly as defined in claim 5, wherein the connecting tube is of aluminum material constructed and arranged so that the compression thereof can be caused by an explosive force without destruction of the tube.

* * * * *